United States Patent [19]

Mochizuki et al.

[11] Patent Number: 4,985,523

[45] Date of Patent: Jan. 15, 1991

[54] ANAEROBICALLY CURING ADHESIVE SEALING COMPOSITION

[75] Inventors: Shuji Mochizuki; Atsushi Okuma; Katsunori Haruna, all of Tokyo, Japan

[73] Assignee: Three Bond Co., Ltd., Hachioji, Japan

[21] Appl. No.: 399,083

[22] Filed: Aug. 28, 1989

Related U.S. Application Data

[62] Division of Ser. No. 171,811, Mar. 22, 1988, abandoned.

[30] Foreign Application Priority Data

Mar. 24, 1987 [JP] Japan ................................. 62-69782
Jan. 18, 1988 [JP] Japan ................................. 63-8144

[51] Int. Cl.$^5$ .................... C08F 26/02; C08F 226/02
[52] U.S. Cl. .................................... 526/301; 522/96; 522/173; 525/920
[58] Field of Search ............... 522/96, 116, 117, 173; 525/920; 526/301

[56] References Cited

U.S. PATENT DOCUMENTS

| | | | |
|---|---|---|---|
| 4,295,909 | 10/1981 | Baccei ......................... | 522/96 |
| 4,446,286 | 5/1984 | Kolycheck et al. ............ | 522/96 |
| 4,608,409 | 8/1986 | Coady et al. .................. | 522/96 |
| 4,690,501 | 9/1984 | Zimmerman et al. .......... | 522/96 |

FOREIGN PATENT DOCUMENTS 0008202  2/1980  European Pat. Off. .
2200021  7/1973  Fed. Rep. of Germany .

*Primary Examiner*—Marion E. McCamish
*Assistant Examiner*—Susan Berman
*Attorney, Agent, or Firm*—Oblon, Spivak, McClelland, Maier & Neustadt

[57] ABSTRACT

An anaerobically curing adhesive sealing composition comprising (A) a mono(meth)acrylate monomer represented by formula (I)

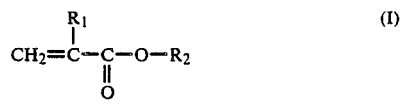

wherein $R_1$ represents a hydrogen atom or a methyl group; and $R_2$ represents

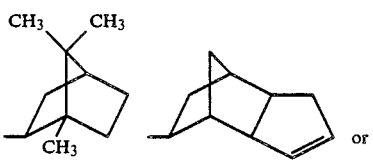

or

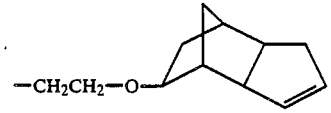

and (B) a (meth)acrylate prepolymer having a urethane structure in the main chain thereof and having an average molecular weight of 10,000 or more and further containing (C) a (meth)acrylate prepolymer having a urethane structure in the main chain thereof and an average molecular weight of at most 5,000. The sealing composition exhibits, upon curing, excellent elasticity and properties to follow an adherend while retaining excellent resistance to oil and heat as possessed by acrylate type reactive sealing compositions.

2 Claims, No Drawings

ANAEROBICALLY CURING ADHESIVE SEALING COMPOSITION

This is a division of application Ser. No. 07/171,811, filed on Mar. 22, 1988, now abandoned.

FIELD OF THE INVENTION

This invention relates to an anaerobically curing adhesive sealing composition, and more particularly to an anaerobically curing adhesive sealing composition suitable for sealing a joint composed of different materials having different coefficients of thermal expansion.

BACKGROUND OF THE INVENTION

Sealing of joints of automobile engines, such as a joint between an oil pan and an engine block, a joint between an engine head and a head cover, and a joint of a transmission, have hitherto been effected by the use of a liquid adhesive sealing composition. Examples of known liquid adhesive sealing compositions include alkyd resins, synthetic rubber resins, phenolic resins, acrylic resins, silicone resins, and the like.

In recent years, there has been a tendency that the joint surfaces, e.g., flange surfaces, to which an adhesive sealing composition is applied are composed of plural different materials, for example, different metals. Therefore, when heat is applied to such an adherend, the stress imposed on the sealing material on the adherend increases due to a difference in coefficient of thermal expansion among the materials constituting the adherend. As a result, the seal itself is caused to peel off or break so that the seal loses its sealing properties. In order to improve properties of an adhesive sealing composition to follow the adherend surface (hereinafter referred to as following properties), various proposals have been made to impart softness and elasticity to the sealing compound.

However, such an improvement of adhesive sealing compositions is accompanied by deterioration of sealing properties, such as chemical resistance, oil resistance, heat resistance, weather resistance, and the like. On the other hand, silicone based sealing compositions exhibit excellent elasticity and following properties but are inferior in oil resistance at high temperatures. Hence, none of the conventional sealing compositions show excellent resistance to heat and oil as well as satisfactory softness and elasticity.

In some cases, the conventional sealing compositions cause oil leakage when applied to parts which are in contact with hydraulic oil and are subjected to temperature changes due to heating. When, in particular, the adherend is composed of different materials, it is more difficult to attain satisfactory following properties.

Acrylic reactive sealing compositions are excellent in oil resistance as described, for example, in U.S. Pat. No. 3,837,963. However, they are inferior in elasticity and following properties and are not applicable to adherends composed of different materials, and particularly those subjected to a large change of temperature.

SUMMARY OF THE INVENTION

Accordingly, one object of this invention is to provide an anaerobically curing adhesive sealing composition which exhibits excellent elasticity and following properties even when applied to an adherend composed of plural materials having different coefficients of thermal expansion or to an adherend subjected to a large change of temperature.

It has now been found that the above object and others which will become more readily apparent hereinafter can be accomplished by an acrylic reactive sealing composition comprising (A) a specific mono(meth)acrylate monomer and (B) a (meth)acrylate prepolymer having a urethane structure in the main chain thereof and having an average molecular weight of 10,000 or more.

The present invention relates to an anaerobically curing adhesive sealing composition comprising (A) a mono(meth)acrylate monomer represented by formula (I)

$$CH_2=C(R_1)-C(=O)-O-R_2 \quad (I)$$

wherein $R_1$ represents a hydrogen atom or a methyl group; and $R_2$ represents

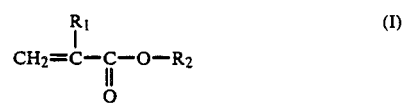

or

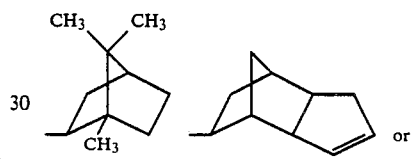

and (B) a (meth)acrylate prepolymer having a urethane structure in the main chain thereof and having an average molecular weight of 10,000 or more.

The present invention further relates to an anaerobically curing adhesive sealing composition comprising the above-described components (A) and (B), and further (C) a (meth)acrylate prepolymer having a urethane structure in the main chain thereof and having an average molecular weight of 5,000 or less.

DETAILED DESCRIPTION OF THE INVENTION

In formula (I), $R_2$ may be substituted with a methyl group, an ethyl group, a halogen atom, a hydroxy group and/or a carboxyl group.

Specific examples of the mono(meth)acrylate monomer which can be used preferably as component (A) in the present invention are shown below.

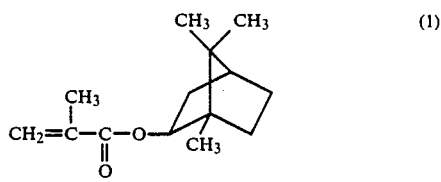

(1)

-continued

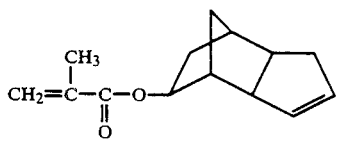
(2)

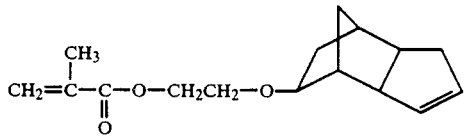
(3)

The (meth)acrylate prepolymer which can be used as component (B) has a urethane structure in the main chain thereof and has at least one polymerizable ethylenically unsaturated double bond at the terminal thereof. The average molecular weight of component (B) is 10,000 or more, and preferably ranges from 10,000 to 100,000. If the average molecular weight of component (B) exceeds 100,000, the reactivity of the prepolymer is reduced, making it difficult to cure the resulting composition at room temperature. If it is lower than 10,000, satisfactory following properties of the cured product cannot be obtained. The molecular weight herein defined is measured by gel permeation chromatography.

The (meth)acrylate prepolymer (B) can be obtained by reacting a polyether polyol and an organic diisocyanate at a molar ratio (the former/the latter) of 1/1 to ½ in a diluent to form a polyurethane prepolymer and reacting the resulting prepolymer with a (meth)acrylate monomer having active hydrogen in an amount sufficient to react with all the remaining isocyanate groups of the polyurethane prepolymer.

Examples of the polyether polyol to be used includes those represented by formulae (II) to (V)

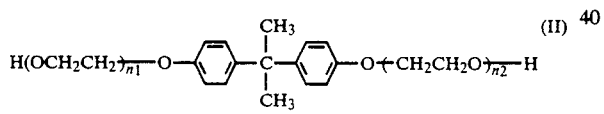
(II)

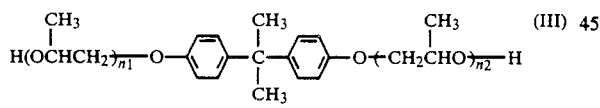
(III)

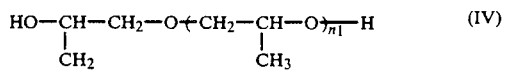
(IV)

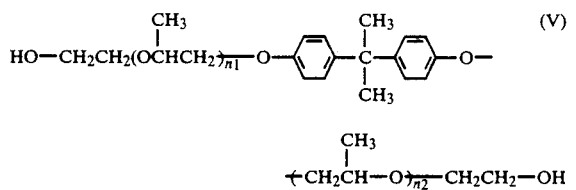
(V)

wherein $n_1$ and $n_2$ each represents an integer of from 1 to 5. The polyether polyols may be used alone or as a mixture thereof.

The component (C) which can be used in the present invention is a urethane type (meth)acrylate prepolymer having a urethane structure in the main chain thereof and having at least one polymerizable double bond in the terminal thereof. The average molecular weight of component (C) is 5,000 or less, and preferably ranges from 500 to 5,000. If the average molecular weight is less than 500, the resulting sealing composition becomes so hard upon curing that the property to follow the adherend is reduced. If it exceeds 5,000, the cured product exhibits insufficient releasability.

The urethane type prepolymer (C) can be obtained, for example, by reacting a polyester diol or polyester polyol represented by formula (VI), (VII) or (VIII) either alone or a mixture thereof with an organic diisocyanate at a molar ratio (the former/the latter) of 1/1 to ½ to obtain a polyurethane prepolymer and reacting the resulting prepolymer with a (meth)acrylate monomer having active hydrogen in an amount sufficient to react with all the remaining isocyanate groups in the prepolymer:

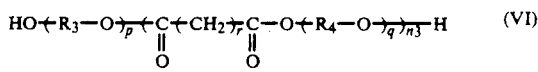
(VI)

wherein p and q each represents an integer of from 1 to 5; r represents an integer of from 2 to 6; $n_3$ represents an integer of from 1 to 6; $R_3$ and $R_4$ each represents a hydrocarbon group (e.g., an alkylene group) having from 2 to 6 carbon atoms which may be substituted with a methyl group, a hydroxy group, a carboxyl group and/or a halogen atom;

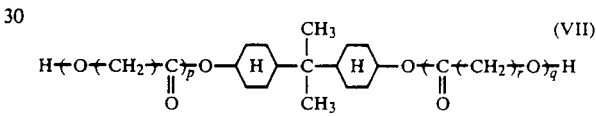
(VII)

wherein p, q, and r are as defined above; and

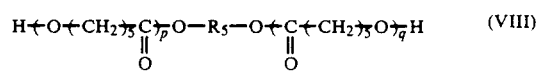
(VIII)

wherein p and q are as defined above; and $R_5$ represents

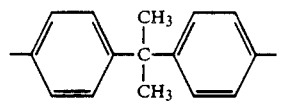

or a hydrocarbon group (e.g., an alkylene group) having from 2 to 6 carbon atoms which may be substituted with a methyl group, a hydroxy group, a carboxyl group and/or a halogen atom.

Incorporation of component (C) into the sealing composition improves elasticity, stretchability and releasability of the cured product while its adhesive strength is reduced. Therefore, although the sealing composition containing component (C) is not suitable for application onto parts where a high adhesive strength is required, the composition is effective to increase ease of disassembly of flanges and suitable as a liquid gasket or for use in application to areas where high elasticity is required, such as vibration insulators.

In the preparation of the components (B) or (C), specific examples of the organic diisocyanate to be reacted with polyether polyol, polyester diol, or polyester polyol include diphenylmethane isocyanate (MDI), tolylene diisocyanate (TDI), xylene diisocyanate (XDI), isophorone diisocyanate (IPDI), naphthalene diisocyanate (NDI), tolidine diisocyanate (TODI), hexamethylene diisocyanate (HDI), dicyclohexylmethane diisocyanate (HMDI), trimethylhexamethylene diisocyanate (TMHDI), etc. Of these, preferred are HDI, HMDI, and TMHDI. These organic diisocyanates can be used either individually or in combinations of two or more thereof.

The (meth)acrylate monomer having active hydrogen to be reacted with a prepolymer includes mono(meth)acrylates of dihydric alcohols, e.g., ethylene glycol, propylene glycol, 1,3-propanediol, 1,3-butanediol, 1,4-butanediol, polyethylene glycol, etc.; and mono(meth)acrylates or di(meth)acrylates of trihydric alcohols, e.g., trimethylolethane, trimethylolpropane, glycerine, etc. These compounds can be used either individually or in combinations of two or more thereof.

The average molecular weights of the components (B) and (C) can be controlled not only by setting the molar ratio of the organic diisocyanate to the polyether polyol, polyester diol, or polyester polyol within the above-recited ranges but also by selecting the amount of the diluent to be used. The diluent can be contained in the urethane (meth)acrylate components (B) and (C) so as to suppress increase in viscosity of the urethane (meth)acrylate components during preparation thereof. The diluent can also be added to the sealing composition to control viscosity of the composition.

The diluent which can be used includes (meth)acrylates represented by the following formulae:

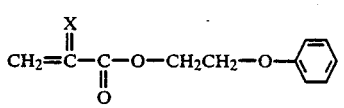

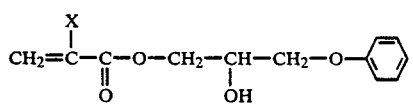

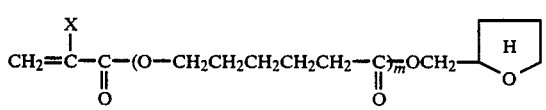

wherein X represents a hydrogen atom or a methyl group; and m represents 1 or 2, such as phenoxyethyl acrylate, phenoxy polyethylene glycol acrylate, 2-hydroxy-3-phenoxypropyl acrylate, etc.

The anaerobically curing adhesive sealing composition of the present invention preferably contains from 5 to 20% by weight of component (A), from 15 to 60% by weight of components (B) and (C) in total, and from 30 to 70% by weight of the diluent. Component (C) may be contained in an amount of 70% by weight or less, preferably up to 50% by weight, based on the total weight of components (B) and (C). If the amount of component (A) is less than 5% by weight the stretchability of the resulting cured product tends to be reduced, and if it exceeds 20% by weight the following properties are deteriorated. If the amount of component (B) or components (B) and (C) in combination is less than 15% by weight, the rubber elasticity of the cured product is reduced and if it exceeds 60% by weight, viscosity of the sealing composition increases so that it becomes difficult to handle the composition. Further, when component (C) is more than 70% by weight based on the total weight of components (B) and (C), the resulting cured product exhibits less elongation. If the amount of the diluent is less than 30% by weight, viscosity of the sealing composition increases, resulting in difficulty in handling the composition, and if it is more than 70% by weight, the viscosity is too low to use as a sealing material.

In addition to the above-described components, the anaerobically curing adhesive sealing composition according to the present invention further comprises a polymerization accelerator, which may be previously incorporated into component (A), (B) or (C), or may be added to the composition as an independent component.

The polymerization initiator to be used is not particularly limited. Any of the conventional polymerization initiators known to be effective in polymerization of (meth)acrylate monomers for obtaining an anaerobically curing alkyl type adhesive composition, such as those described in Japanese Patent Publication No. 20555/76, can be employed. Typical examples of such polymerization initiators are diacyl peroxides, peroxy esters, dialkyl peroxides, hydroperoxides, ketone peroxides, peroxy ketals, and the like. Particularly preferred are hydroperoxides, e.g., cumene hydroperoxide, t-butyl hydroperoxide, etc.; dialkyl peroxides, e.g., 2,5-dimethyl-2,5-di(t-butylperoxy)hexyne-3, etc.; and cyclic peroxy ketals, e.g., 3,6,6,9,9-pentamethyl-3-n-butyl-1,2,4,5-tetraoxycyclononane, 3,6,6,9,9-pentamethyl-3-(sec-butyl)-1,2,4,5-tetraoxycyclononane, etc. These polymerization initiators may be used either individually or in combinations of two or more thereof.

The polymerization accelerator to be used is not particularly limited and can be selected appropriately according to the relation to the polymerization initiator used. For example, known polymerization accelerators to be used for polymerization of (meth)acrylate monomers in the preparation of an anaerobically curing alkyl type adhesive composition, e.g., those disclosed in Japanese Patent Publication No. 20555/76, can be employed. Typical examples of such polymerization accelerators include organic sulfonimides, tertiary amines, primary amines (e.g., primary alkylamines), and secondary amines (e.g., heterocyclic secondary amines).

If desired, the adhesive sealing compound of the present invention may further contain other additives for the purpose of imparting desired properties to the composition, such as plasticizers, dyes, fillers, thixotropic agents, aggregates, stabilizers, polymerization inhibitors, and the like.

The above-described polymerization accelerators, polymerization initiators and other additives can be used arbitrarily insofar as the desired performance properties can be obtained without impairing the anaerobic property and adhesive sealing properties of the sealing composition.

For the purpose of imparting ultraviolet curing properties to the sealing composition, a photopolymerization initiator, e.g., benzophenone, benzoin alkyl ethers, 2,2-dimethoxy-2-phenylacetophenone, 2,2-diethoxyacetophenone, 1-hydroxycyclohexyl phenyl ketone, benzyl dimethyl ketal, benzyl-β-methoxyethyl acetal, methyl benzoyl, acetophenone, dimethylthioxanthone, 4-methoxybenzophenone, 4-isopropyl-2-hydroxy-2-methylpropiophenone, 2-hydroxy-2-methylpropiophenone, 2-methoxyanthraquinone, etc., can be incorporated into the sealing composition. By incorporating the photopolymerization initiator, the adhesive sealing composition applied onto areas subject to air exposure, i.e., surfaces in contact with air or the squeeze-out of the adhesive sealing composition, can be cured easily and completely by irradiating the sealing composition with ultraviolet rays under given conditions.

Further, incorporation of phosphoric ester type additives into the adhesive sealing composition of the invention is effective to improve adhesion and photo-curing properties as well as heat-curing properties.

The cured product of the adhesive sealing composition according to the present invention exhibits excellent heat resistance and oil resistance as inherently possessed by acrylate type adhesive composition, combined with excellent properties to follow the surface of adherends and excellent durability. It is particularly suited for adhesion and sealing of parts composed of plural materials having different coefficients of thermal expansion to markedly ensure sealing performance. Accordingly, the adhesive sealing compound of the present invention is suitably applicable to parts of hydraulic controlling mechanisms and internal combustion engines, such as a joint between a flange part of an oil pan and an engine block, a joint between an engine head and a head cover, a joint of a transmission, etc. In these uses, sealing materials preferably having an elongation of more than about 100% and a tensile strength of not less than 10 kgf/cm² but generally not more than 40 kgf/cm² are required. The sealing composition of the invention is also applicable to large-sized flanges accompanied by large positional deviation on working.

It has been conventionally proposed to impregnate an anaerobically curing composition mainly comprising a (meth)acrylic ester into a sheet to form a gasket. According to this technique, however, since the cured product is too hard, the resin of the sheet gasket sandwiched between flanges is broken upon application of pressure, thereby lessening the sealing properties. To the contrary, when a sheet gasket impregnated with the anaerobically curing adhesive sealing composition of the present invention is cured under an air-free condition while being pressed between flanges, the cured product is not broken by impact or pressure due to its high elasticity, thus maintaining superior sealing properties.

In addition, it is possible to apply the adhesive sealing composition according to the present invention by screen printing.

The composition of the present invention can be used in a wide range of applications including the above-described application, such as adhesion of planes, joining of various parts, locking of screws, fixing of shaft couplings, and the like.

The anaerobically curing adhesive sealing composition of the invention remains uncured in a liquid state for a long period of time while being in contact with air or oxygen, but is readily polymerized upon being applied onto an adherend in an air- or oxygen-free atmosphere or upon excluding air or oxygen after application to an adherend.

The anaerobically curing adhesive sealing composition of the invention may be formulated into a one-part system room-temperature curing type or two-part system comprising a part containing a polymerization initiator and another part containing a polymerization accelerator which are combined on use.

The present invention is now illustrated in greater detail with reference to Examples and Comparative Examples, but it should be understood that the present invention is not to be limited thereto. In these examples, all the parts, percents and ratios are by weight unless otherwise indicated.

EXAMPLE 1

(1) Synthesis of Urethane (Meth)acrylate Prepolymer (U-1) A diol (0.19 mol) having formula

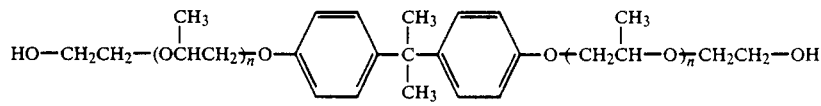

wherein n represents an integer of from 1 to 5, and 0.2 mol of TMHDI were mixed in the presence of butylhydroxytoluene (BHT) as polymerization inhibitor, and to the mixture was added dibutyltin dilaurate as catalyst in an amount of 0.01% by weight based on the mixture. Further, phenoxyethyl acrylate was added thereto as diluent in the same weight as that of the diol-TMHDI mixture. The amount of the polymerization inhibitor was 0.4% by weight based on the total weight of the diol, TMHDI, and the diluent. The resulting mixture was allowed to react at 70° C. for 2 hours.

Then, 0.02×2 mols of 2-hydroxyethyl methacrylate was (2-HEMA) added to the reaction mixture to synthesize polyurethane methacrylate. The resulting prepolymer was designated as U-1. U-1 was estimated to have an average molecular weight between 50,000 and 70,000 as determined by gel-permeation chromatography (GPC).

(2) Synthesis of Urethane (Meth)acrylate Prepolymer (U-2) A diol (1.4 mol) having formula

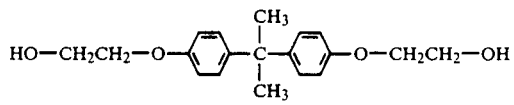

and 2 mols of HDI were mixed in the presence of 0.4% by weight, based on the total weight of the diol, DHI and the diluent described later, of BHT as polymerization inhibitor, and to the mixture was added 0.01% by weight, based on the mixture, of dibutyltin dilaurate as catalyst. Further, phenoxyethyl acrylate was added thereto as diluent in the same weight as that of the diol-HDI mixture. The resulting mixture was allowed to react at 70° C. for 2 hours.

Then, 2 mols of 2-hydroxyethyl acrylate was added to the reaction mixture, and the reaction was continued for an additional 2 hours to synthesize polyurethane methacrylate. The resulting prepolymer was designated as U-2. U-2 was estimated to have an average molecular weight of about 20,000 as determined by GPC.

EXAMPLE 2

A polyester polyol (1.0 mol) obtained from adipic acid and 1,4-butanediol was mixed with 2 mols of TMHDI in the presence of 0.4%, based on the polyester polyol-TMHDI mixture, of BHT as polymerization initiator. To the mixture was added 0.01%, based on the mixture, of dibutyltin dilaurate as catalyst. The resulting mixture was allowed to react at 80° C. for 1 hour.

Then, at least 3 mols of 2-HEMA was added to the mixture, and the reaction was continued for an additional 1 hour to obtain polyurethane methacrylate having an average molecular weight of about 1,000. The resulting urethane prepolymer was designated as U-3.

EXAMPLE 3

The following components were mixed at the indicated composition ratios to obtain various anaerobically curing adhesive sealing compositions (Samples 1–11)

| Sample 1 | |
|---|---|
| U-1 | 70 parts |
| Phenoxyethyl acrylate | 20 parts |
| Dicyclopentenyloxyethyl methacrylate | 10 parts |
| Disodium ethylenediaminetetraacetate | 0.02 part |
| Oxalic acid | 0.01 par |
| o-Benzoic acid sulfimide | 1 part |
| Cumene hydroperoxide | 1 part |
| N-ethylmetatoluidine | 0.2 part |
| Sample 2 | |
| U-1 | 50 parts |
| U-3 | 20 parts |
| Phenoxyethyl acrylate | 20 parts |
| Dicyclopentenyloxyethyl methacrylate | 10 parts |
| Disodium ethylenediaminetetraacetate | 0.02 part |
| Oxalic acid | 0.01 part |
| o-Benzoic acid sulfimide | 1 part |
| Cumene hydroperoxide | 1 part |
| N-ethylmetatoluidine | 0.2 part |
| Sample 3 | |
| U-1 | 50 parts |
| U-3 | 20 parts |
| Phenoxyethyl acrylate | 25 parts |
| Dicyclopentenyloxyethyl methacrylate | 5 parts |
| Disodium ethylenediaminetetraacetate | 0.02 part |
| Oxalic acid | 0.01 part |
| o-Benzoic acid sulfimide | 1 part |
| Cumene hydroperoxide | 1 part |
| N-ethylmetatoluidine | 0.2 part |
| Sample 4 | |
| U-2 | 75 parts |
| Phenoxyethyl acrylate | 25 parts |
| Dicyclopentenyloxyethyl methacrylate | 5 parts |
| Disodium ethylenediaminetetraacetate | 0.02 part |
| Oxalic acid | 0.01 part |
| o-Benzoic acid sulfimide | 1 part |
| Cumene hydroperoxide | 1 part |
| N-ethylmetatoluidine | 0.2 part |
| Sample 5 | |
| U-2 | 50 parts |
| U-3 | 20 parts |
| Phenoxyethyl acrylate | 20 parts |
| Dicyclopentenyloxyethyl methacrylate | 10 parts |
| Disodium ethylenediaminetetraacetate | 0.02 part |
| Oxalic acid | 0.01 part |
| o-Benzoic acid sulfimide | 1 part |
| Cumene hydroperoxide | 1 part |
| N-ethylmetatoluidine | 0.2 part |
| Sample 6 | |
| U-1 | 50 parts |
| Phenoxyethyl acrylate | 15 parts |
| Dicyclopentenyloxyethyl methacrylate | 15 parts |
| Disodium ethylenediaminetetraacetate | 0.02 part |
| Oxalic acid | 0.01 part |
| o-Benzoic acid sulfimide | 1 part |
| Cumene hydroperoxide | 1 part |
| N-ethylmetatoluidine | 0.2 part |
| Sample 7 | |
| U-1 | 50 parts |
| U-3 | 20 parts |
| Phenoxyethyl acrylate | 10 parts |
| Dicyclopentenyloxyethyl methacrylate | 20 parts |
| Disodium ethylenediaminetetraacetate | 0.02 part |
| Oxalic acid | 0.01 part |
| o-Benzoic acid sulfimide | 1 part |
| Cumene hydroperoxide | 1 part |
| N-ethylmetatoluidine | 0.2 part |
| Sample 8 | |
| U-2 | 50 parts |
| U-3 | 35 parts |
| Phenoxyethyl acrylate | 5 parts |
| Dicyclopentenyloxyethyl methacrylate | 10 parts |
| Disodium ethylenediaminetetraacetate | 0.02 part |
| Oxalic acid | 0.01 part |
| o-Benzoic acid sulfimide | 1 part |
| Cumene hydroperoxide | 1 part |
| N-ethylmetatoluidine | 0.2 part |
| Sample 9 | |
| U-1 | 20 parts |
| U-2 | 20 parts |
| U-3 | 20 parts |
| Phenoxyethyl acrylate | 20 parts |
| Dicyclopentenyloxyethyl methacrylate | 20 parts |
| Disodium ethylenediaminetetraacetate | 0.02 part |
| Oxalic acid | 0.01 part |
| o-Benzoic acid sulfimide | 1 part |
| Cumene hydroperoxide | 1 part |
| N-ethylmetatoluidine | 0.2 part |
| Sample 10 | |
| U-1 | 40 parts |
| Phenoxyethyl acrylate | 45 parts |
| Dicyclopentenyloxyethyl methacrylate | 15 parts |
| Disodium ethylenediaminetetraacetate | 0.02 part |
| Oxalic acid | 0.01 part |
| o-Benzoic acid sulfimide | 1 part |
| Cumene hydroperoxide | 1 part |
| N-ethylmetatoluidine | 0.2 part |
| Sample 11 | |
| U-1 | 40 parts |
| U-3 | 40 parts |
| Phenoxyethyl acrylate | 10 parts |
| Dicyclopentenyloxyethyl methacrylate | 10 parts |
| Disodium ethylenediaminetetraacetate | 0.02 part |
| Oxalic acid | 0.01 part |
| o-Benzoic acid sulfimide | 1 part |
| Cumene hydroperoxide | 1 part |
| N-ethylmetatoluidine | 0.2 part |

TEST 1

A cured product of each of Samples 1 and 11 was evaluated for hardness (Shore hardness, A scale), elongation, tensile strength, and peel strength. These tests were carried out using No. 2 dumbbell specimens prepared according to JIS K6301. The results obtained are shown in Table 1 below.

For comparison, the same evaluations were made on "TB 1131" (polyester methacrylate produced by Three Bonds Co., Ltd.) as comparative sample (Comparative Example 1).

TABLE 1

| Sample No. | Hardness | Elongation (%) | Tensile Strength (kgf/cm$^2$) | Strength (kgf) |
|---|---|---|---|---|
| 1 | 32 | 190 | 16 | 2.5 |
| 2 | 36 | 170 | 18 | 0.4 |
| 3 | 26 | 200 | 12 | Strength |
| 4 | 20 | 240 | 9 | 2.0 |
| 5 | 34 | 180 | 16 | 0.4 |
| 6 | 40 | 150 | 22 | 3.0 |
| 7 | 60 | 110 | 32 | 0.6 |
| 8 | 34 | 175 | 17 | 0.3 |
| 9 | 72 | 90 | 40 | 0.4 |
| 10 | 45 | 160 | 24 | 1.8 |
| 11 | 38 | 165 | 17 | 0.3 |
| Comparative Example 1 | 90 | 30 | 50 | 1.0 |

As can be seen from Table 1, the cured product of Samples 1 to 11 according to the present invention are excellent in stretchability and elasticity and satisfactorily follow the surface of an adherend. It is also apparent that the cured products of Samples 1, 4, 6, and 10 exhibit high adhesive strength to an adherend and that the cured products of Samples 2, 3, 5, 7, 8, 9, and 11 exhibit excellent releasability.

TEST 2

No. 2 dumbbell specimens for testing oil resistance were prepared from Samples 1, 2, 3, 5, 6, 8, and 10 in the same manner as in Test 1. In order to evaluate resistance to oil and cooling water, the specimen was immersed in oil A, B or C or cooling water hereinafter described under the conditions shown, and a percent change in weight between before and after the immersion was determined from the following equation $$[Percent\ Change\ in\ Weight] = (W_1 - W)/W \times 100$$

wherein W is the weight of the specimen before the immersion and $W_1$ is that after the immersion. The results obtained are shown in Table 2.

Oil A: Gear oil (75W-90); 120° C.×7 days
Oil B: Automatic transmission fluid (ATF); 150° C.×7 days
Oil C: Engine oil (10W-30); 120° C.×7 days
Cooling Water: 50% Long life coolant (LLC); 100° C.×7 days.

TABLE 2

| Sample No. | Oil A (%) | Oil B (%) | Oil C (%) | Cooling Water (%) |
| --- | --- | --- | --- | --- |
| 1 | −1.8 | −1.2 | +1.2 | +3.5 |
| 2 | −1.5 | −1.0 | +1.0 | +3.0 |
| 3 | −1.6 | −1.0 | +1.1 | +3.1 |
| 5 | −1.4 | −1.0 | +0.8 | +3.0 |
| 6 | −1.6 | −1.0 | +1.2 | +3.3 |
| 8 | −1.5 | −0.8 | +1.0 | +3.2 |
| 10 | −1.7 | −1.1 | +1.2 | +3.4 |

It is apparent from the results of Table 2 that the cured products of the present invention retain excellent resistance to oil and cooling water as possessed by acrylate adhesive sealing compositions.

TEST 3

Test specimens for determining Fe shearing adhesion (100 mm×25 mm×1.6 mm) were prepared according to JIS G3141. Each of Samples 2, 3, 5, and 8 containing components (A), (B) and (C) was applied to a 10 mm wide overlap of the specimen. After allowing the specimens to stand at 25° C. for 24 hours, they were placed in a drying oven at 130° C. or 150° C. each for 10 days, 20 days or 30 days. The specimens were taken out of the drying oven, cooled to room temperature and evaluated for heat resistance (Fe/Fe) by determining an adhesive strength under shear according to JIS K6850. The results obtained are shown in Table 3.

For comparison, the same evaluation was made on "TB 1131" (Comparative Example 2).

TABLE 3

| Sample No. | Blank (kgf/cm²) | Temperature | After Strength (kgf/cm²) | | |
| --- | --- | --- | --- | --- | --- |
| | | | 10 Days | 20 Days | 30 Days |
| 2 | 23.0 | 130° C. | 24.2 | 33.4 | 31.8 |
| | | 150° C. | 26.4 | 34.8 | 37.2 |
| 3 | 21.0 | 130° C. | 23.2 | 30.5 | 31.2 |
| | | 150° C. | 25.0 | 33.4 | 38.2 |
| 5 | 24.0 | 130° C. | 25.2 | 34.4 | 35.5 |

TABLE 3-continued

| Sample No. | Blank (kgf/cm²) | Temperature | After Strength (kgf/cm²) | | |
| --- | --- | --- | --- | --- | --- |
| | | | 10 Days | 20 Days | 30 Days |
| | | 150° C. | 27.2 | 39.0 | 39.5 |
| 8 | 22.0 | 130° C. | 24.4 | 34.5 | 35.2 |
| | | 150° C. | 26.8 | 39.5 | 41.2 |
| Comparative Example 2 | 64.0 | 130° C. | 83.0 | 94.0 | 110.0 |
| | | 150° C. | 89.0 | 95.0 | 120.0 |

As is shown in Table 3, the cured products of the samples containing components (A), (B) and (C) according to the present invention exhibit not only excellent releasability but excellent heat resistance as possessed by the conventional acrylate adhesive sealing composition with little change with time. On the other hand, the comparative sample suffers large change of heat resistance with time.

TEST 4

Each of Samples 1, 2, 3, 5, 6, 8, and 10 was applied between a pair of flanges, one made of iron and the other made of aluminum, each having an inner diameter of 100 mm and a 10 mm wide overlap, and the flange joint was pressed under a pressure of 40 kgf/cm², followed by allowing to stand for 24 hours. The joint was placed in a thermal cycle tester and subjected to thermal change, one hour at −40° C. and one hour at 120° C. making a cycle. After 100 cycles, the joint was taken out of the tester and sealing properties were determined using turbing oil as a medium to be sealed up. The results obtained are shown in Table 4 below, in which the values (kgf/cm²) mean the force imposed on the turbine oil at the point when the turbine oil leaks from the sealed joint.

For comparison, the same evaluation was made using TB 1110B or TB 1131 (products of Three Bonds Co., Ltd.) (Comparative Examples 3 and 4).

TABLE 4

| Sample No. | Blank (kgf/cm²) | After 100 Cycles (kgf/cm²) |
| --- | --- | --- |
| 1 | 27 | 21 |
| 2 | 24 | 19 |
| 3 | 22 | 18 |
| 5 | 24 | 19 |
| 6 | 28 | 20 |
| 8 | 22 | 19 |
| 10 | 26 | 19 |
| Comparative Example 3 | 18 | 3 |
| Comparative Example 4 | 22 | 4 |

From the results of Table 4, it can be seen that when a flange joint is composed of different materials, i.e., iron and aluminum, the conventional adhesive sealing composition shows poor properties to follow the surface of the flange due to a difference of coefficient of thermal expansion between the different materials and suffers extreme reduction of sealing performance when subjected to thermal change. To the contrary, the sealing compositions according to the present invention exhibit superior sealing properties even when applied to parts that are made of different materials and also subjected to heat change.

As described above, the anaerobically curing composition comprising the components (A) and (B) according to the present invention retains excellent characteristics possessed by acrylate adhesive sealing compositions, such as oil resistance, heat resistance, and the like, and exhibits, upon curing, excellent elasticity and following properties to show satisfactory sealing performance. It is particularly noteworthy that the cured sealing material of the present invention exhibits superior sealing properties because of its excellent following properties even when applied between different materials having different coefficients of thermal expansion and is, therefore, suitable for application to large-sized flanges which are liable to large positional deviation on working.

Further, the anaerobically curing adhesive sealing composition comprising the components (A), (B), and (C) according to the present invention exhibits excellent releasability in addition to the above-described performance properties. Such releasability can be taken advantage of when the sealing composition is utilized as, for example, a liquid gasket because it can be easily removed for exchange of parts.

Moreover, since the anaerobically curing adhesive sealing composition according to the present invention exhibits elasticity upon curing, it can be used as impregnated into a porous sheet, non-woven fabric, etc.

While the invention has been described in detail and with reference to specific embodiments thereof, it will be apparent to one skilled in the art that various changes and modifications can be made therein without departing from the spirit and scope thereof.

What is claimed is:

1. An anaerobically curing adhesive sealing composition comprising (A) a mono(meth)acrylate monomer represented by formula (I)

$$CH_2=\overset{R_1}{\underset{}{C}}-\underset{\underset{O}{\|}}{C}-O-R_2 \qquad (I)$$

wherein $R_1$ represents a hydrogen atom or a methyl group; and $R_2$ represents

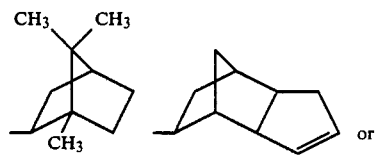

or

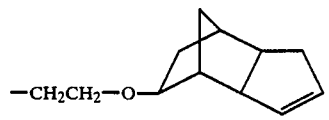

(B) a (meth)acrylate prepolymer having a urethane structure in the main chain thereof and having an average molecular weight of at least 10,000 and (C) a (meth)acrylate prepolymer having a urethane structure in the main chain thereof and an average molecular weight of from 500 to 5,000, said methacrylate prepolymer (B) being the reaction product of an isocyanate terminated polyurethane prepolymer, prepared from a polyether polyol and an organic diisocyanate, with a (meth)acrylate of a polyhydric alcohol having active hydrogen which is a mono(meth)acrylate of a dihydric alcohol or a (mono)methacrylate or di(meth)acrylate of a trihydric alcohol and said (meth)acrylate prepolymer (C) being a polyester diol or a polyester polyol-diisocyanate reaction product having isocyanate terminal groups reacted with a (meth)acrylate of a polyhydric alcohol as defined above, and wherein the polyether polyol employed to prepare component (B) is at least one compound of the formula (II), (III), (IV) or (V);

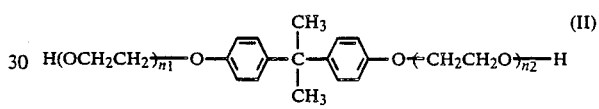

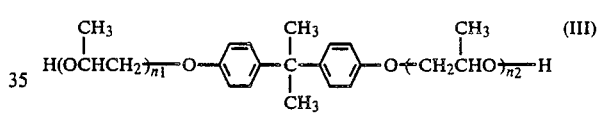

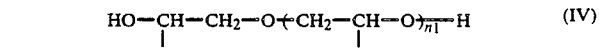

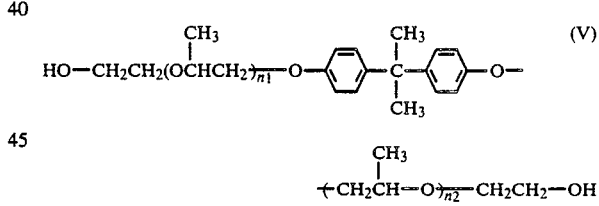

wherein $n_1$ and $n_2$ each represents an integer of from 1 to 5.

2. An anaerobically curing adhesive sealing composition as claimed in claim 1 wherein the component (A) is dicyclopentenyloxyethyl methacrylate.

* * * * *